United States Patent
Serbin et al.

(10) Patent No.: US 7,245,940 B2
(45) Date of Patent: Jul. 17, 2007

(54) PUSH TO TALK VOICE BUFFERING SYSTEMS AND METHODS IN WIRELESS COMMUNICATION CALLS

(75) Inventors: Clay Serbin, Encinitas, CA (US); Scott R. Cirksena, Chula Vista, CA (US); Aaron C. Teague, Victorville, CA (US); Murtuza Chhatriwala, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 351 days.

(21) Appl. No.: 10/969,386

(22) Filed: Oct. 19, 2004

(65) Prior Publication Data

US 2006/0084476 A1    Apr. 20, 2006

(51) Int. Cl.
H04B 1/38    (2006.01)
H04M 1/00    (2006.01)
(52) U.S. Cl. ............... 455/563; 455/518; 455/412.1; 455/552.1; 455/519; 370/328; 370/352
(58) Field of Classification Search ............... 455/563, 455/518, 519, 409, 412.1, 445, 90.2, 552.1
See application file for complete search history.

(56) References Cited

U.S. PATENT DOCUMENTS

| | | | |
|---|---|---|---|
| 4,742,514 A * | 5/1988 | Goode et al. ............... 370/280 |
| 5,724,410 A * | 3/1998 | Parvulescu et al. ....... 379/88.18 |
| 5,841,853 A | 11/1998 | Yamanishi et al. |
| 5,914,958 A | 6/1999 | Chinitz et al. |
| 6,032,020 A * | 2/2000 | Cook et al. ..................... 455/7 |
| 6,157,828 A | 12/2000 | Krishnamurthi |
| 6,157,843 A * | 12/2000 | Derango et al. ............. 455/518 |
| 6,226,533 B1 * | 5/2001 | Akahane ...................... 455/566 |
| 6,275,690 B1 * | 8/2001 | Higuchi et al. ........... 455/412.2 |
| 6,304,764 B1 * | 10/2001 | Pan .......................... 455/569.2 |
| 6,625,198 B1 | 9/2003 | Tiedemann, Jr. et al. |
| 6,738,617 B2 | 5/2004 | Rosen et al. |
| 6,799,034 B2 * | 9/2004 | Higuchi et al. ........... 455/414.4 |
| 6,826,174 B1 * | 11/2004 | Erekson et al. ............. 370/352 |
| 6,865,398 B2 * | 3/2005 | Mangal et al. ............ 455/552.1 |
| 6,999,921 B2 * | 2/2006 | Harris et al. ................. 704/215 |
| 7,043,266 B2 * | 5/2006 | Chaturvedi et al. ......... 455/519 |
| 7,136,630 B2 * | 11/2006 | Xie ........................... 455/412.1 |
| 2003/0119539 A1 | 6/2003 | Needham et al. |
| 2003/0148779 A1 | 8/2003 | Aravamudan et al. |
| 2003/0153339 A1 | 8/2003 | Crockett et al. |

FOREIGN PATENT DOCUMENTS

| | | |
|---|---|---|
| EP | 0 321 672 A | 6/1989 |
| EP | 0321672 | 6/1989 |
| WO | WO 90/06636 A | 6/1990 |

* cited by examiner

*Primary Examiner*—Marceau Milord

(57) ABSTRACT

Systems and methods are provided for voice buffering for a VOVC PTT call. The buffering starts before the VOVC call is established.

20 Claims, 3 Drawing Sheets

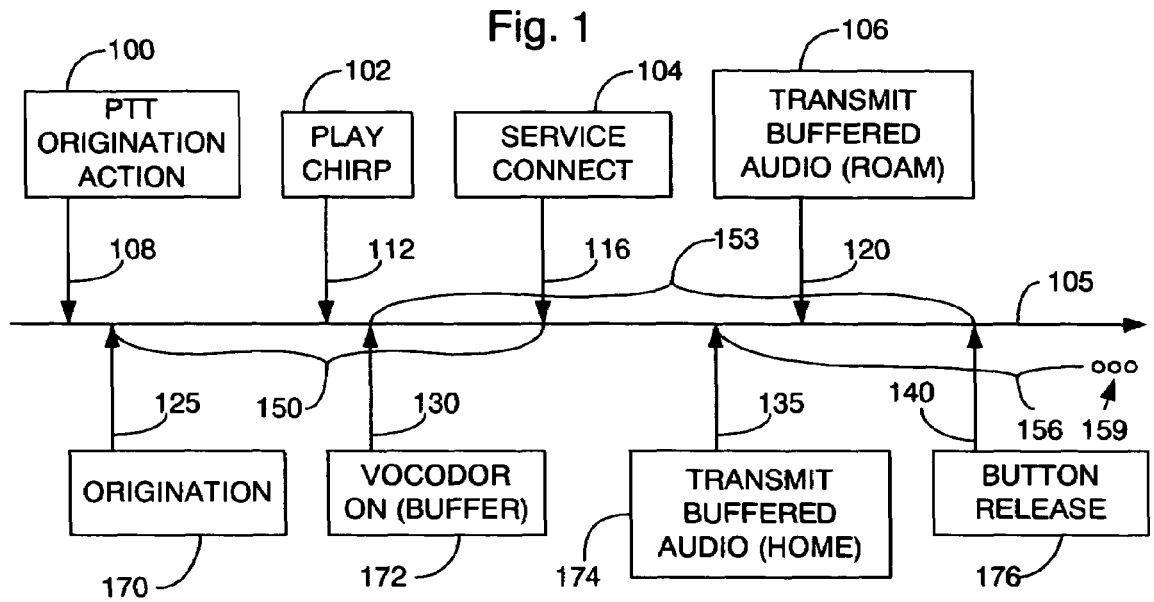
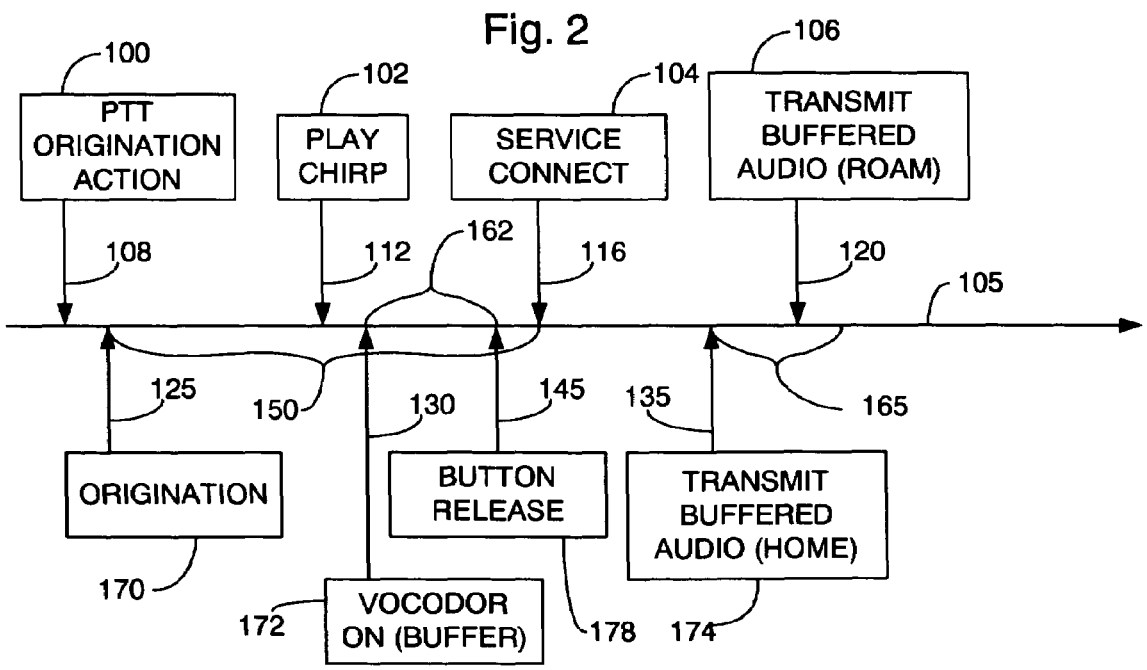

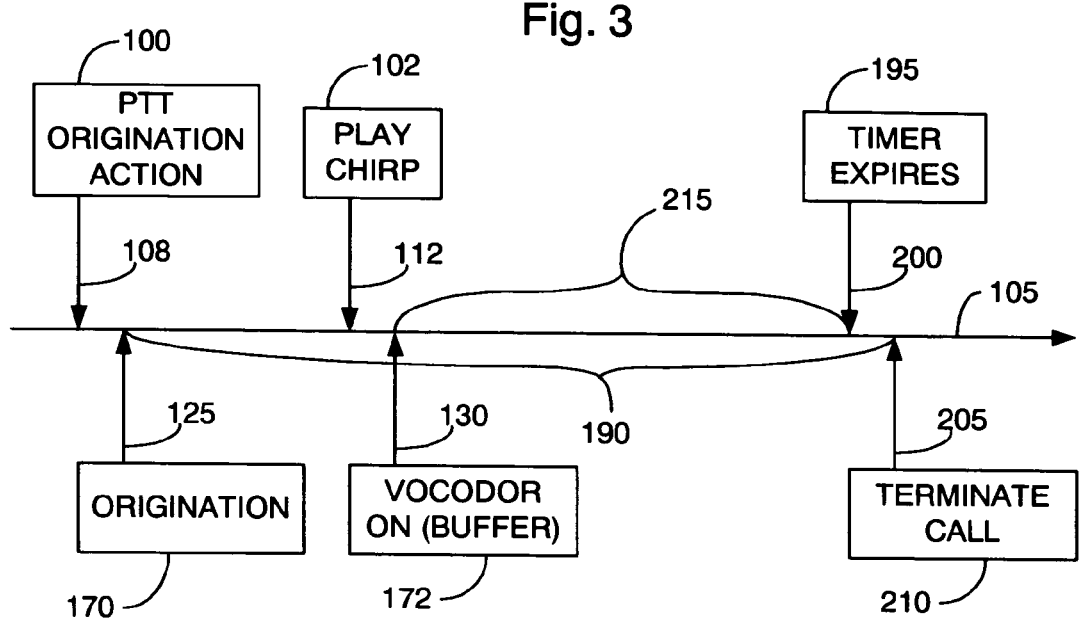
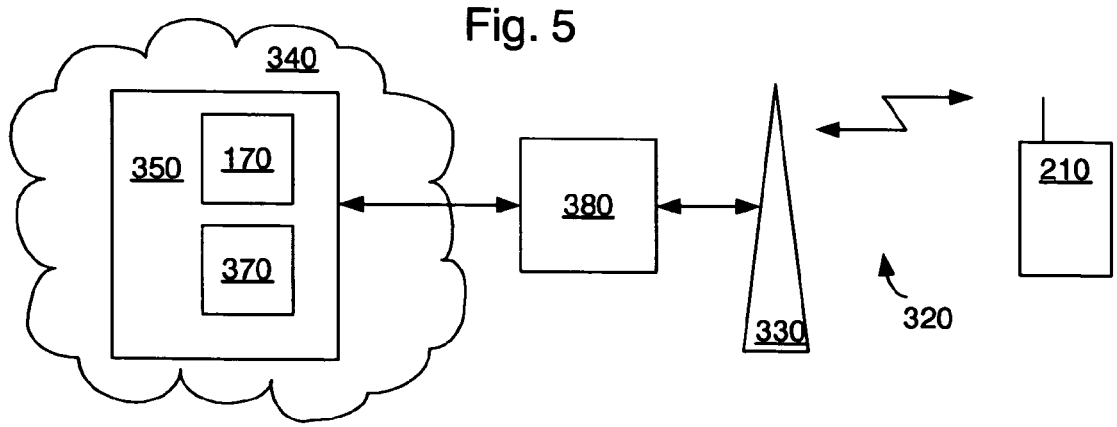

PUSH TO TALK VOICE BUFFERING SYSTEMS AND METHODS IN WIRELESS COMMUNICATION CALLS

RELATED APPLICATIONS

The present patent application relates to U.S. patent application Ser. No. 10/903,174 "CALL PROCESSING SYSTEM AND METHOD", filed on Jul. 30, 2004, by Murtuza Chhatriwala and Joseph Giacalone.

BACKGROUND OF THE INVENTION

1. Field of the Invention

The invention relates generally to wireless communication and more particularly to systems and methods for voice buffering in wireless communication.

2. Background

Wireless communication device users are demanding faster and faster connection times. Instant connectivity is the goal. Push to talk (PTT) communications are one method of reducing delays in wireless communications, especially in cellular communications, such as communication by cellular telephone (also known as cell phones). In PTT communications, the user merely has to push a button on the cell phone to be connected with another person by cell phone. The other person does not have to hear a ring or even answer the cell phone. In other words, the cell phones can be configured to be automatically connected, without any intervention by the receiving party. PTT systems are described further in U.S. patent application Ser. No. 10/903,174 "CALL PROCESSING SYSTEM AND METHOD", filed on Jul. 30, 2004, by Murtuza Chhatriwala and Joseph Giacalone, which is hereby incorporated herein by reference.

PTT communication is typically faster than standard cell phone communications. However, many PTT users want even shorter call set-up times. Call set-up time can be can be between five and 20 seconds, or more. Delays between initiating a push to talk (PTT) session and the time when the initiator is allowed to begin speaking are frustrating to PTT wireless communication device users.

In voice over internet protocol (VoIP) PTT systems, the problem is solved by buffering the audio data (e.g., voice) in a memory buffer while waiting for the call to set up. One problem with buffering in a voice over voice channel (VOVC) is that traditionally, at the time of completion of the set-up of a VOVC call, commands are sent to initialize the vocoder on the wireless communication device. Buffering audio works smoothly in VoIP systems, among other reasons, because the set-up of a data call does not trigger initialization of the vocoder.

Other problems with buffering in a VOVC relate to receiving incoming messages such as other PTT calls and normal voice calls. Again, buffering in a VoIP call works smoothly, because normal VoIP calls do not allow incoming calls such as other PTT calls and normal voice calls. Thus, voice buffering can be added to VoIP calls smoothly without problems caused by other incoming messages, such as other PTT calls and normal voice calls.

SUMMARY OF THE INVENTION

In order to avoid the problems associated with VOVC PTT calls, voice buffering is provided for a VOVC PTT call. The buffering starts before the VOVC call is established. The PTT user can begin talking before the VOVC call is established.

Other aspects, advantages, and novel features of the invention will become apparent from the following Detailed Description, when considered in conjunction with the accompanying drawings.

BRIEF DESCRIPTION OF THE DRAWINGS

Embodiments of the present invention taught herein are illustrated by way of example, and not by way of limitation, in the figures of the accompanying drawings, in which:

FIG. 1 shows a relational timing diagram illustrating call set-up, audio buffering and transmission events.

FIG. 2 shows a relational timing diagram illustrating call set-up, audio buffering and transmission events.

FIG. 3 shows a relational timing diagram illustrating attempted call set-up and audio buffering events.

FIG. 5 shows a block diagram of a wireless communication system for transmitting and receiving buffered audio over a VOVC PTT call.

DETAILED DESCRIPTION

Figure 4:
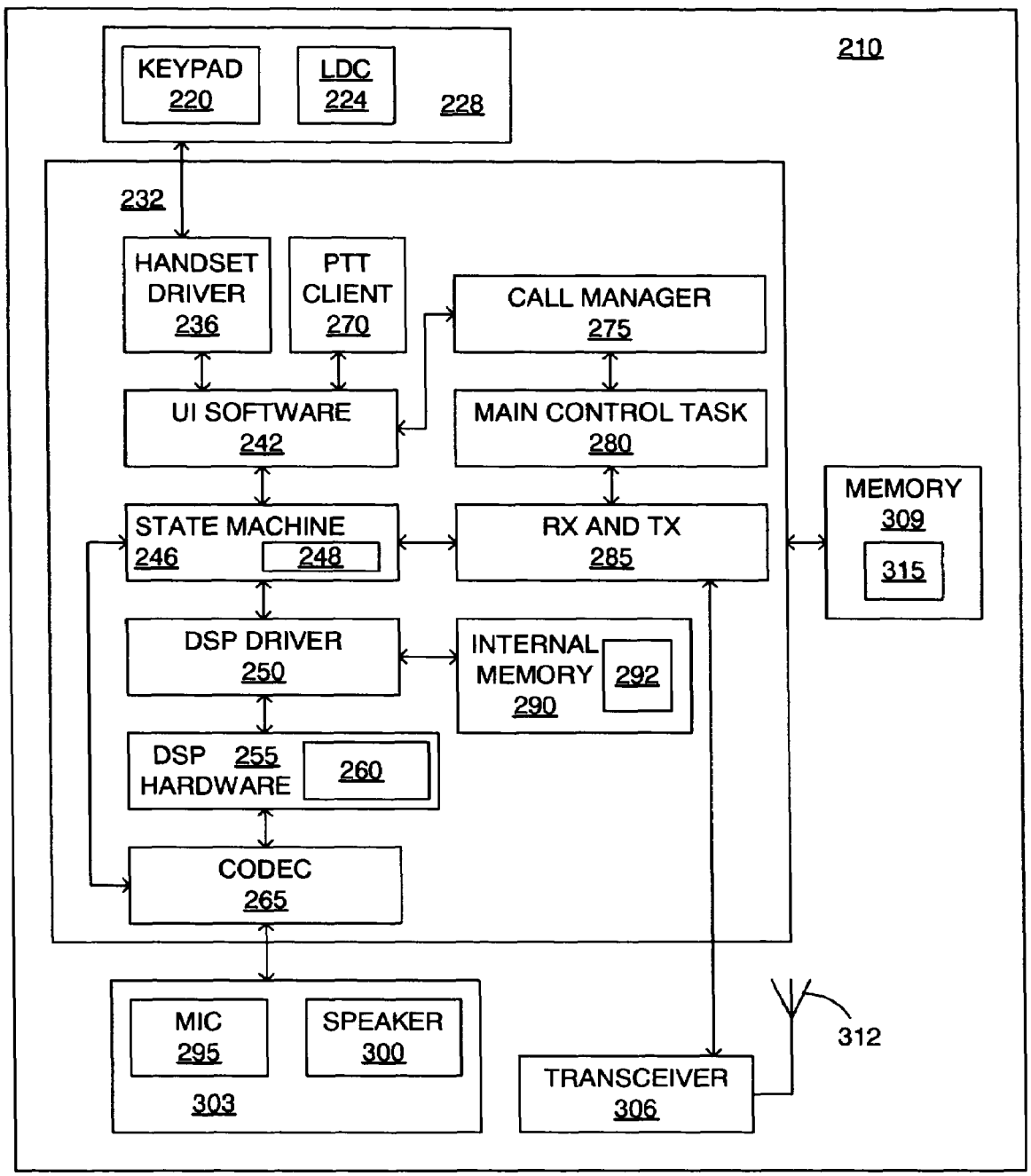
FIG. 4 shows a block diagram illustrating a wireless communication device capable of storing buffered audio information for communication over a VOVC PTT call.

FIG. 1 shows a relational timing diagram illustrating call set-up, audio buffering and transmission events, so that buffered audio can be transmitted by a wireless communication device, even in a VOVC PTT call. The wireless communication device, also known as a handset, may be, for example, a cellular telephone, also known as a cell phone. Time 105 is represented by arrow 105. PTT origination action 100 may be a user pushing a PTT button, at the beginning of the sequence, as shown by arrow 108. In response to the origination action 100, the cell phone (described later with respect to FIG. 4) sends an origination message 170. Arrow 125 represents the origination message 170 being sent over the air to a wireless communication network as described later with respect to FIG. 5.

At this time 125, the wireless communication network begins trying to establish a wireless communication connection with the cell phone, as described later with respect to FIG. 5. It commonly takes 5 to 10 seconds to establish a wireless communication connection. This delay can be frustrating to users, particularly those users who have selected PTT communications because of its speed of connecting. The primary advantage of a PTT device over other cell phones is that the PTT connection is generally established faster, because the party on the other end does not have to hear a ring and make the communication connection by pressing a button for send or "OK". Instead, the PTT connection is automatic. Thus, a delay of 5 or 10 seconds between a PTT command 100, such as pressing the PTT button, and the chirp telling the user that the user can speak, is often too long. Advantageously, as will be described further below, the user can begin speaking immediately after pressing the PTT button, or after some convenient delay, such as, for example, one second.

The time is not to scale in FIG. 1, or any of the figures that follow. Rather, time is shown to describe the relative order of events. For example, origination message 170 is shown after PTT origination event 100 to indicate that PTT origination event 170 occurs after PTT origination action 100. The wireless communication device sends out the origination based on the slot cycle index (SCI) of the wireless communication device. The SCI may be set to zero (0), meaning that the shortest slot cycle of 1.28 seconds is used. It could take up to 1.28 seconds to send out the origination. The origination typically is sent between 200 ms and 800 ms after the PTT origination action. The base station and the wireless communication device are synchronized and the wireless communication device is assigned slots on which it can send. With SCI=0, the wireless communication device gets a slot once every 1.28 seconds. Hence the time could be as large as 1.28 seconds.

Some events occur several microseconds apart in time, while others occur several ms apart in time. Still others occur several seconds apart in time. Because of the wide disparity between relative time differences it is not convenient to show time to scale.

Advantageously, about one second after origination 170, the cellular telephone indicates to the user that the user can begin speaking for the PTT call, as shown by play chirp command 102. Commonly in PTT communications, the handset indicates to the user that the user can begin speaking by making a chirp-like sound. Any convenient type of indication can be used in place of the chirp. The playing of the chirp is indicated by arrow 112. Since the user hears this chirp about one second after pressing the PTT button instead of five to ten seconds, user frustration is avoided. The time delay of one second between the PTT button press and the chirp is configurable. Any convenient time, including zero seconds, can be designated.

At or about the time that the chirp plays 112, the cell phone issues a command 172 to the vocoder (not shown) to turn on and to start recording audio information in memory (not shown). The recorded information is stored in memory for later transmission. The vocoder is turned on and the memory begins filling with recorded audio as shown by arrow 130. Storing information in memory can be referred to as buffering or recording. Recording or buffering includes capturing the information with a transducer such as a microphone and storing the information in memory. In other words, the cell phone buffers the audio information for transmitting the audio information at a later time. Audio information is buffered during the time indicated by curve 153. Vocoder could be turned on shortly before playing the chirp. In that case, arrow 130 would be before arrow 112.

After the call is set up by the wireless communication network, the network sends a service connect message 104 to the cell phone. As shown by arrow 116, the cell phone receives service connect message 104. As stated above, this will commonly be about five to ten seconds after the origination message 170 was sent. Advantageously, the audio input has already been being buffered for about four to nine seconds.

At this time, the cell phone could transmit the buffered audio to the network. However, some delay may be necessary for the PTT server to set up the call, beyond the time necessary for the wireless communication network to set up the call. Accordingly, the cell phone may wait a certain time, such as, for example, four more seconds, until transmitting the buffered audio, as shown by transmit buffered audio command 174. The transmission of the buffered audio is shown by arrow 135. In the case where the handset is roaming, the transmission may be delayed until the transmit buffered audio (roam) command 106 at arrow 120. This may be about seven seconds after the service connect message 104 is received at 116. The delay between the service connect message 104 and the transmission of the buffered audio commands 174 or 106 are configurable. The transmission of the buffered audio continues until the buffer is empty, as shown by curve 156.

As can be seen by the overlap of time periods 153 and 156, the cell phone may be simultaneously buffering new audio information while transmitting the oldest audio information stored in the buffer. A circular buffer can be employed to transmit audio information of any duration. If a long origination audio session occurs, the buffer will continue to cycle, recording over and over along the buffer and just playing out the buffer ahead of the recording. A twenty second circular buffer may be used.

At some time, the user releases the PTT button, or the PTT call is otherwise terminated. The call termination 176, or button release 176, is shown at arrow 140. This determines the length of the call origination audio information transmitted. As shown by ellipses 159, the transmission of the audio information may continue for some time and terminate at a later time, not shown. The duration of time period 156 may be equal to the duration of time period 153.

The call may stay up for some time after the call originator releases the floor. Other users may or may not respond during the call. After releasing the call, the originator may start talking again if and when the floor is available. This can be done by pressing the PTT button again. At that point (not shown), audio information would be captured again, digitized by the CODEC, shown and described with respect to FIG. 4, and compressed for transmission by the vocodor, also shown and described with respect to FIG. 4.

FIG. 2 shows a relational timing diagram illustrating call set-up, audio buffering and transmission events, so that buffered audio can be transmitted by a wireless communication device, even in a VOVC PTT call. FIG. 2 is similar to FIG. 1, except that the timing of button release 178 has changed. In the illustration of FIG. 2, the user releases the PTT button before the service connect message 104. In this case, the duration 162 of the buffered audio is much shorter. In this case the buffered audio is still transmitted over the air at the time indicated by arrow 135 or arrow 120, over time duration 165. Additionally, the button release may occur between arrows 116 and 135 or even between arrows 135 and 120. The time duration between arrows 116 and 135 is configurable, as is the time duration between arrows 116 and 120.

Another scenario will now be described with reference to FIG. 3. FIG. 3 shows a relational timing diagram illustrating attempted call set-up and audio buffering events. In the case of FIG. 3, the call set-up has failed. A timer expires as shown by event 195, at time 200. If timer expires, the call is terminated as shown by event 210 at the time indicated by arrow 205. The audio information was buffered starting at arrow 130 and until arrow 200, as shown by duration 215. At the time 200 that the timer expires or at the time 205 that the call is terminated, the buffer is emptied. The timer expire event 195 can be triggered by the buffer becoming full, instead of an actual timer expiring. In other words, a separate timer may not be necessary. A certain memory size can be designated for the buffer. When the buffer is full, the time is up.

FIG. 4 shows a block diagram illustrating wireless communication device 210 capable of storing buffered audio information for communication over a VOVC PTT call. Wireless communication device 210 may be a cell phone 210.

Processor 232 processes information for cell phone 210. Processor 232 is connected to transceiver 312 for modulating and demodulating wireless communication signals. Antenna 312 is connected to transceiver for transmitting the wireless communication signals over the air. A power supply (not shown) is also connected to processor 232 and transceiver 306 for providing power to processor 232 and transceiver 306.

Processor 232 may include general processor modules or dedicated processor modules. For example, processor may include dedicated circuits for performing fast Fourier transforms (FFT's). Several functions are shown inside processor. Some of the functions shown may be implemented in software running on processor 232 and some functions may be dedicated circuits. Furthermore, more than one processor (not shown) may be used to implement the functions shown. Still further, different types of processors may be included, such as RISC processors, ARM processors, field programmable logic gate arrays, and any convenient type of processor. Combinations of one or more processors and discreet components such as, for example, operational amplifiers, capacitors and inductors may also be used. Processor 232 will be understood to encompass any convenient type of processor and accompanying circuits.

Processor 232 is also connected to audio user interface device 303, other user interface device 228 and memory 309. Audio user interface device 303 includes microphone 295 and speaker 300. Other user interface device 228 includes push button interface 220, designated as keypad in FIG. 4 and display 224 designated as liquid crystal display (LCD) in FIG. 4.

User interface module 242 generally controls what the user sees on display 224 and handles input from user through keypad 220. Keypad 220 includes a PTT button (not shown separately). The PTT button may be located on a different surface from the main keypad, but the PTT button will still be considered part of the keypad. Further, PTT origination event 100 (shown with respect to FIG. 1) may be generated by some combination of button presses of the PTT button and other buttons. For example, PTT origination event may be a push of the PTT button after certain third party contact list information is selected from menus shown by UI software module 236 on display 224. Further, the PTT origination event may be a result of a voice recognition event. The options for PTT origination events will not be described further here. Handset driver 236 interfaces between UI software 242 and other UI device 228.

UI software 242 interfaces with call manager 275 and state machine 246. Responsive to PTT origination event 100, UI software 242 passes the message to call manager 275 that a call should be started. PTT client 270 resides on processor 232 and manages PTT calls for cell phone 270. Call manager 275 passes the message to main control task 280 to originate a voice call. Main control task 280 causes transmit and receive module 285 to transmit the voice call origination request to transceiver 306. Transceiver 306 modulates the request for transmission over the air by antenna 312.

At the time of the origination request, UI software 242 optionally starts a timer (not shown) and, after the timer expires, possibly one second, causes the state machine 246 to play a chirp sound through codec 265 to speaker 300. Alternatively, the chirp sound can be played immediately upon receipt of the PTT origination action 100. Codec 265 quantizes or digitizes audio signals from microphone and converts digital signals from state machine 246 into analog signals for playing over microphone 295.

At about the same time that chirp is played over speaker 300 (as described with respect to FIG. 1), UI software 242 gives state machine 246 commands to initialize the vocoder 260 and begin recording (buffering) sound, that is, audio. Vocoder resides on digital signal processing (DSP) hardware and is an algorith for compressing digital speech audio data for transmission over a limited bandwidth communications channel. Vocoder 260 must first be acquired, because many tasks may want to use vocoder. So state machine 246 first tells DSP driver 250, which interfaces between DSP hardware 255 and state machine 246, to load vocodor image 315 into DSP hardware 255, to use a portion of DSP hardware as vocoder 260.

Vocoder image 315 may be stored in memory 309. There are several different images that cause DSP 255 to behave in different ways. For example, a voice recognition engine (not shown) causes one DSP image to be loaded into DSP hardware 255, while a sound software module (not shown) causes a different DSP image to be loaded into DSP hardware 255. As stated above, vocodor image 315 is loaded into DSP hardware for recording voice. Advantageously, vocodor image 315 may be the same image used for voice calls. As will be described later, this helps prevent audio glitches, such as, for example, crackles and pops, from occurring when a voice call connect message is received.

To buffer the audio information coming in from microphone 295, state machine 246 requests DSP driver 250 to store the audio information in the DSP driver's internal memory 290. Internal memory 290 is shown external to DSP driver 250, but internal memory could be internal to DSP driver 250. Due to speed considerations, memory 290 is internal to processor 232. In some conditions, it may be possible to buffer the audio information in external memory 309.

DSP driver 250 receives voice recorded interrupts from DSP hardware 255 every 20 ms. The voice recorded interrupts indicate that a 20 ms recording of voice data (or a packet) 292 is available to be stored (buffered). State machine 246 causes DSP driver 250 to store the voice packet 292 in internal memory 290.

Referring to FIGS. 1, 2, 3 and 4, state machine 246 receives voice packet interrupts every 20 ms during the buffering time periods 153 (FIG. 1), 162 (FIG. 2), and 215 (FIG. 3). During time periods 153, 162 and 215, state machine 246 causes DSP driver 250 to store the voice packets 292 in internal memory 290.

At the time of service connect message 104 (with respect to FIGS. 1 and 2), call manager 275 causes UI software 242 to send a message through state machine 246 to acquire and configure vocoder 260 for the voice call that is to be connected in response to service connect message 104. Advantageously, vocoder 260 is already configured for voice recording. That is, voice recording vocoder image 315 is already loaded into vocoder. Advantageously, the voice recording image 315 is the same image used for voice calls.

Alternatively, the message to configure vocoder 260 can be intercepted by state machine 246. Vocoder 246 can set a flag indicating that audio data is already being buffered and that vocoder 260 should not be re-initialized (by reloading vocoder image 315). Reloading vocoder image 315 would cause an audio glitch in the buffered audio. The recipient of the buffered audio would likely hear an annoying scratch sound.

During the period after service connect message 104 and before transmit audio 135 or 120, state machine 246 tells receive and transmit module 285 that there is no audio information (also known as voice data or voice information) to be sent. This may be done in an enhanced variable rate codec (EVRC) system by packaging a one eighth rate voice packet 248 and transmitting the one eighth rate voice packet 248 to the receive and transmit module 285. Thus, in an EVRC system, eighth rate data will be sent, conserving network resources during this time period (typically about four seconds).

Once the transmission of the voice packets 292 starts, state machine 246 receives voice transmit interrupts from receive and transmit module 285 every 20 ms. In response to the voice transmit interrupts, state machine 246 causes DSP driver 250 to pass one voice packet over to receive and transmit module 285. With reference to FIGS. 1 and 2, this happens during time periods 156 and 165.

Thus, the circular buffering, described above with respect to FIG. 1, proceeds by recorded voice packet interrupts every 20 ms and transmit voice packet interrupts every 20 ms. The recorded voice packet interrupts come from DSP hardware 255 by request from vocodor 260 and are received by DSP driver 250. In response to recorded voice packet interrupts, DSP driver 246 stores voice packets 292 in internal memory 290. The transmit voice packet interrupts come from receive and transmit module 285. In response to the transmit voice packet interrupts (which can also be referred to as traffic channel interrupts), state machine 246 causes DSP driver 250 to retrieve a voice packet 292 from internal memory 290. State machine 246 passes the packet 292 to receive and transmit module 285 for transmission over the air through transceiver 306 and antenna 312.

FIG. 5 shows a block diagram of a wireless communication system 320 for transmitting and receiving buffered audio in a VOVC PTT call. Wireless communication device 210 transmits signals over the air to base station 330. Base station 330 is connected to wireless communication network 380. Wireless communication network 380 may include systems such as mobile switching centers (not shown) and other systems (not shown) that are necessary for a network operator to manage cellular communications.

The wireless communication network may be any digital wireless communication network having a digital voice channel. For example, the wireless communication network may be a code division multiple access network complying with the Telecommunications Industry Association and Electronics Industry Alliance Standard IS-2000 Series (TIA/EIA-IS-2000). As another example, the wireless communication network may be a global system for communication (GSM) network, complying with GSM standard by the GSM Association. Other types of digital wireless communication networks are possible.

Wireless communication network 380 is connected to internet 340, shown as internet cloud 340. PTT server 350 is on internet 340. PTT server 350 provides PTT services for wireless communication device 210 and other wireless communication devices (not shown). As described with respect to FIGS. 1-4, wireless communication device 210 transmits PTT origination message 170 to network 380. Network 380 passes PTT origination message 170 to PTT server 350. PTT server 350 responds to PTT origination message 170 by attempting to establish a PTT connection with a different PTT user or users (not shown). PTT server 350 stores presence information 370 for the other PTT user. Based on the presence information 370, PTT server 350 sets up a PTT session with the other user or users.

Advantageously, the user of wireless communication device 210 does not have to wait for PTT server 350 to set up the PTT session with the other user or users. As shown by play chirp command 102 and vocoder on command 172, referring to FIGS. 1-3, the user can begin speaking before the PTT session is established.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for processing wireless communication audio information, the method comprising the steps of:
    receiving a voice channel push to talk request;
    recording first audio information;
    selecting a first digital signal processing image from a plurality of digital signal processing images, said first digital signal processing image for processing said first audio information;
    receiving a voice channel call connect message; and
    transmitting the first audio information over a voice channel.

2. The method of claim 1, further comprising the step of:
    identifying a second digital signal processing image producing an identification of the second digital signal processing image, responsive to the step of receiving the voice channel call connect message.

3. The method of claim 2, wherein the second digital signal processing image is the same as the first digital signal processing image.

4. The method of claim 2, further comprising the step of:
    recording second audio information using the first digital signal processing image, after the step of receiving the voice channel call connect message.

5. The method of claim 1, wherein: the step of selecting includes selecting an enhanced variable rate CODEC vocoder image; and the step of recording includes recording the audio information in an enhanced variable rate CODEC format.

6. The method of claim 1, further comprising the step of:
    waiting a predetermined time period between the steps of:
    receiving a voice channel call connect message and transmitting the first audio information over a voice channel.

7. The method of claim 6, further comprising the steps of:
    determining whether a wireless communication device is roaming or not roaming;
    waiting a second predetermined time period in addition to the first predetermined time period if the device is roaming.

8. The method of claim 1, further comprising the step of:
    receiving an indication over a wireless communication channel that the step of recording should be performed.

9. A wireless communication device comprising:
    a transceiver;
    a memory; and
    a processor connected to the memory and to the transceiver and configured to:
        receive a voice channel push to talk request;
        record first audio information on the memory;
        select a first digital signal processing image from a plurality of digital signal processing images, said first digital signal processing image for processing said first audio information;
        receive a voice channel call connect message; and
        deliver the first audio information to the transceiver for transmission of the recorded audio information over a wireless communication channel on a voice channel.

10. The device of claim 9, wherein the processor is further configured to identify a second digital signal processing image producing an identification of the second digital signal processing image, responsive to the step of receiving the voice channel call connect message.

11. The device of claim 10, wherein the second digital signal processing image is the same as the first digital signal processing image.

12. The device of claim 10, wherein the processor is further configured to record second audio information using the first digital signal processing image, after receiving the voice channel call connect message.

13. The device of claim 9, wherein the processor is further configured to select an enhanced variable rate CODEC vocoder image; and record the audio information in an enhanced variable rate CODEC format.

14. The device of claim 9, wherein the processor is further configured to wait a predetermined time period between: receiving a voice channel call connect message and delivering the recorded audio information over a voice channel.

15. The device of claim 9, wherein the processor is further configured to:
determine whether a wireless communication device is roaming or not roaming; and
wait a second predetermined time period in addition to the first predetermined time period if the device is roaming.

16. The device of claim 9, wherein the processor is further configured to receive a message from the wireless communication channel, the message indicating that the recording should be performed.

17. A method for processing wireless communication audio information, the method comprising the steps of:
receiving a voice channel push to talk request;
recording first audio information;
selecting a first digital signal processing image;
receiving a voice channel call connect message;
identifying a second digital signal processing image and producing an identification of the second digital signal processing image responsive to receiving the voice channel call connect message;
transmitting the first audio information over a voice channel;
storing an indicator that the first audio information is being recorded;
intercepting the identification of the second digital signal processing image;
retaining the first digital signal processing image; and
recording second audio information using the first digital signal processing image, after the step of intercepting the identification of the second digital signal processing image.

18. A wireless communication device comprising:
a transceiver;
a memory; and
a processor connected to the memory and to the transceiver and configured to:
receive a voice channel push to talk request;
record first audio information on the memory;
store an indicator that the first audio information is being recorded;
select a digital signal processing image;
receive a voice channel call connect message;
identify a second digital signal processing image producing an identification of the second digital signal processing image, responsive to receiving the voice channel call connect message;
deliver the first audio information to the transceiver for transmission of the recorded audio information over a wireless communication channel on a voice channel;
intercept the identification of the second digital signal processing image; and
retain the first digital signal processing image and record additional audio information using the first digital signal processing image, after intercepting the identification of the second digital signal processing image.

19. A method for processing wireless communication audio information, the method comprising the steps of:
receiving a voice channel push to talk request;
recording first audio information;
loading into memory a first digital signal processing image for processing said first audio information;
receiving a voice channel call connect message;
identifying a second digital signal processing image for processing said voice channel call;
transmitting the first audio information over a voice channel;
retaining in memory the first digital signal processing image; and
recording second audio information for processing by the first digital signal processing image.

20. A wireless communication device comprising:
a transceiver;
a memory; and
a processor connected to the memory and to the transceiver and configured to:
receive a voice channel push to talk request;
record first audio information;
load into the memory a first digital signal processing image for processing said first audio information;
receive a voice channel call connect message;
identify a second digital signal processing image for processing said voice channel call;
transmit the first audio information over a voice channel;
retain in memory the first digital signal processing image; and
record second audio information for processing by the first digital signal processing image.

* * * * *